United States Patent
Joshi

(10) Patent No.: US 10,070,315 B2
(45) Date of Patent: Sep. 4, 2018

(54) SECURITY MANAGEMENT ON A MOBILE DEVICE

(71) Applicant: AT&T Intellectual Property I, L.P., Atlanta, GA (US)

(72) Inventor: Kaustubh Joshi, Scotch Plain, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 242 days.

(21) Appl. No.: 14/089,942

(22) Filed: Nov. 26, 2013

(65) Prior Publication Data

US 2015/0150085 A1    May 28, 2015

(51) Int. Cl.
*H04L 29/06* (2006.01)
*H04W 12/08* (2009.01)
*H04W 88/02* (2009.01)

(52) U.S. Cl.
CPC ............ *H04W 12/08* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 6,327,612 B1 * | 12/2001 | Watanabe | G06Q 10/107 709/206 |
| 7,034,691 B1 | 4/2006 | Rapaport et al. | |
| 7,051,075 B1 * | 5/2006 | Machino | G06Q 10/107 709/206 |
| 7,051,277 B2 | 5/2006 | Kephart et al. | |
| 7,073,193 B2 | 7/2006 | Marsh | |
| 7,113,977 B1 * | 9/2006 | Baker | G06Q 10/107 709/206 |
| 7,359,936 B2 | 4/2008 | Gruen et al. | |
| 7,650,644 B2 * | 1/2010 | Cheng | G06F 21/6218 705/2 |
| 7,673,324 B2 * | 3/2010 | Tirosh | G06F 21/556 726/1 |
| 7,693,943 B2 | 4/2010 | Rajan et al. | |
| 7,743,059 B2 | 6/2010 | Chan et al. | |
| 7,752,269 B2 * | 7/2010 | Chan | G06F 21/6236 709/206 |
| 7,810,031 B2 * | 10/2010 | Coleman | G06Q 10/107 715/200 |
| 7,885,931 B2 | 2/2011 | Seo et al. | |

(Continued)

OTHER PUBLICATIONS

Morgan Ames; Managing Mobile Multitasking: The Culture of iPhones on Stanford Campus, ACM Feb. 2013; 12 pages (Year: 2013).*

(Continued)

*Primary Examiner* — Jeffrey C Pwu
*Assistant Examiner* — Baotram Tran
(74) *Attorney, Agent, or Firm* — Hanley, Flight & Zimmerman, LLC

(57) ABSTRACT

A method for managing security levels on a mobile device includes receiving a capsule including first data; assigning a first data tag to the capsule, the first data tag identifying a security level for the first data; storing the capsule on the mobile device; executing a process on the mobile device, the process associated with an application tag; allowing the process to access the first data when the application tag matches the first data tag, the process for generating second data in response to the first data.

18 Claims, 4 Drawing Sheets

(56) References Cited

U.S. PATENT DOCUMENTS

| | | | |
|---|---|---|---|
| 8,010,548 B1 | 8/2011 | Beddow | |
| 8,150,930 B2 | 4/2012 | Satterfield et al. | |
| 8,229,931 B2 | 7/2012 | Rothmuller et al. | |
| 8,364,680 B2 | 1/2013 | Bilbrey | |
| 8,392,409 B1 | 3/2013 | Kashyap et al. | |
| 8,533,192 B2* | 9/2013 | Moganti | G06F 17/30265 707/737 |
| 8,813,193 B2* | 8/2014 | Kim | H04L 63/10 726/27 |
| 8,867,741 B2* | 10/2014 | McCorkindale | H04N 1/44 380/243 |
| 9,363,239 B1* | 6/2016 | Luman | H04L 63/105 |
| 2002/0088000 A1* | 7/2002 | Morris | H04N 1/00132 725/105 |
| 2003/0135748 A1* | 7/2003 | Yamada | G06F 21/10 713/193 |
| 2003/0177319 A1* | 9/2003 | de Jong | G06Q 20/341 711/154 |
| 2004/0078568 A1* | 4/2004 | Pham | G06F 21/6218 713/165 |
| 2005/0060643 A1 | 3/2005 | Glass et al. | |
| 2005/0114661 A1* | 5/2005 | Cheng | G06F 21/6218 713/167 |
| 2005/0182821 A1* | 8/2005 | Chan | G06F 21/6236 709/207 |
| 2005/0204008 A1* | 9/2005 | Shinbrood | H04L 51/08 709/206 |
| 2005/0222933 A1* | 10/2005 | Wesby | G06Q 40/00 705/36 R |
| 2006/0047957 A1* | 3/2006 | Helms | G06F 21/10 713/165 |
| 2006/0224750 A1* | 10/2006 | Davies | H04L 51/24 709/229 |
| 2007/0022091 A1* | 1/2007 | Styles | G06F 21/6227 |
| 2007/0156693 A1* | 7/2007 | Soin | G06F 21/604 |
| 2007/0239844 A1* | 10/2007 | Yokoyama | G06F 3/14 709/217 |
| 2007/0261099 A1* | 11/2007 | Broussard | H04L 63/102 726/1 |
| 2008/0040126 A1 | 2/2008 | Estrada et al. | |
| 2008/0086695 A1 | 4/2008 | Oral et al. | |
| 2008/0162652 A1* | 7/2008 | True | G06Q 10/107 709/206 |
| 2008/0222707 A1* | 9/2008 | Pathuri | G06F 21/62 726/4 |
| 2008/0282344 A1* | 11/2008 | Shuster | H04L 51/12 726/21 |
| 2008/0289037 A1* | 11/2008 | Marman | H04L 51/12 726/22 |
| 2009/0070866 A1* | 3/2009 | Erikson | H04L 63/126 726/14 |
| 2009/0119324 A1* | 5/2009 | Simard | G06F 17/30011 |
| 2010/0011053 A1* | 1/2010 | Bhogal | G06Q 10/00 709/203 |
| 2010/0043070 A1* | 2/2010 | Okada | G06F 21/6209 726/21 |
| 2010/0049807 A1* | 2/2010 | Thompson | G06Q 10/107 709/206 |
| 2010/0257268 A1* | 10/2010 | Landry | G09B 7/00 709/225 |
| 2010/0318613 A1* | 12/2010 | Souza | G06Q 10/107 709/206 |
| 2011/0289294 A1* | 11/2011 | Maeda | G06F 21/74 711/163 |
| 2012/0030242 A1* | 2/2012 | Nakamura | G06F 21/6218 707/781 |
| 2012/0036054 A1 | 2/2012 | Zuber | |
| 2012/0072420 A1* | 3/2012 | Moganti | G06F 17/30265 707/737 |
| 2012/0143931 A1* | 6/2012 | Rosenberger | G06F 17/301 707/828 |
| 2012/0166442 A1* | 6/2012 | Furuichi | G06F 17/30707 707/740 |
| 2012/0185479 A1 | 7/2012 | Korver | |
| 2012/0191646 A1 | 7/2012 | Faitelson et al. | |
| 2012/0191792 A1* | 7/2012 | Chebiyyam | G06Q 10/107 709/206 |
| 2012/0192286 A1 | 7/2012 | Messing et al. | |
| 2012/0271957 A1* | 10/2012 | Carney | G06Q 10/107 709/228 |
| 2012/0331568 A1* | 12/2012 | Weinstein | H04L 12/185 726/29 |
| 2013/0024454 A1 | 1/2013 | Dunn | |
| 2014/0189878 A1* | 7/2014 | Michio | G06F 21/608 726/26 |
| 2014/0365877 A1* | 12/2014 | Jacobson | G06F 17/2288 715/255 |
| 2015/0033283 A1* | 1/2015 | Mulder | H04L 63/20 726/1 |

OTHER PUBLICATIONS

Ardagna et al., Providing Users' Anonymity in Mobile Hybird Networks; ACM May 2013; 33 pages (Year: 2013).*

Allard et al., Secure Personal Data Servers: a Vision Paper; VLDB Endowment Sep. 2010; 11 pages (Year: 2010).*

Mancini et al., From Spaces to Places: Emerging Contexts in Mobile Privacy, ACM Sep. 2009; 10 pages (Year: 2009).*

Pereira et al., Survey and Analysis of Current Mobile Learning Applications and Technologies; ACM2013; 35 pages (Year: 2013).*

Ghosh et al., Software Security and Privacy Risks in Mobile E-Commerce; ACM Feb. 2001; 7 pages (Year: 2001).*

Kim et al., Personal Chronicling Tools for Enhancing Information Archival and Collaboration in Enterprises; ACM Oct. 2004; 10 pages (Year: 2004).*

Garfinkel et al., "How to Make Secure Email Easier to Use", Papers, Email and Security, CHI Apr. 2-7, 2005, Portland, Oregon, pp. 701-710.

Park et al., "Fine-Grained and Scalable Message Protection in Sensitive Organizations", Journal of Software, vol. 2, No. 6, Dec. 2007, pp. 64-75.

* cited by examiner

US 10,070,315 B2

SECURITY MANAGEMENT ON A MOBILE DEVICE

BACKGROUND

The present disclosure relates generally to security management on mobile devices. Mobile devices, such as smartphone and tablets, are quickly becoming the dominant platform over which cloud services and content are consumed. For example, many workplaces now allow employees to use their own personal mobile devices to access employer resources (e.g., bring your own device or BYOD). One challenge faced by users of mobile devices is preventing the co-mingling of personal information and workplace information.

One exemplary existing solution allows a user to create separate personal and workplace environments on the same device. The enterprise data and applications are hosted in the cloud, and consumed from the mobile device using a thin-client solution. This architecture results in duplication for the user. Duplication also occurs when virtual machines running on the phone or other sandboxed environments on are used. For example, the user may run different email applications for the personal environment and for the workplace environment, different applications for reading/modifying content (PDF files, etc.), different settings applications, etc. Furthermore, the applications made accessible in the workplace environment have to be individually certified to ensure that they do not leak sensitive data to unauthorized parties.

BRIEF SUMMARY

Exemplary embodiments include a method for managing security levels on a mobile device, the method including receiving a capsule including first data; assigning a first data tag to the capsule, the first data tag identifying a security level for the first data; storing the capsule on the mobile device; executing a process on the mobile device, the process associated with an application tag; allowing the process to access the first data when the application tag matches the first data tag, the process for generating second data in response to the first data.

Other exemplary embodiments include an apparatus including a processor; and memory comprising computer-executable instructions that, when executed by the processor, cause the processor to perform operations, the operations including receiving a capsule including first data; assigning a first data tag to the capsule, the first data tag identifying a security level for the first data; storing the capsule on the mobile device; executing a process on the mobile device, the process associated with an application tag; allowing the process to access the first data when the application tag matches the first data tag, the process for generating second data in response to the first data.

Other exemplary embodiments include a computer program product, tangibly embodied on a non-transitory computer readable medium, for managing security levels on a mobile device, the computer program product including instructions that, when executed by a processor, cause the processor to perform operations including receiving a capsule including first data; assigning a first data tag to the capsule, the first data tag identifying a security level for the first data; storing the capsule on the mobile device; executing a process on the mobile device, the process associated with an application tag; allowing the process to access the first data when the application tag matches the first data tag, the process for generating second data in response to the first data.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF EXEMPLARY EMBODIMENTS

Referring now to the drawings wherein like elements are numbered alike in the several FIGURES.

The detailed description explains the exemplary embodiments, together with advantages and features, by way of example with reference to the drawings.

DETAILED DESCRIPTION OF DRAWINGS

Figure 1:
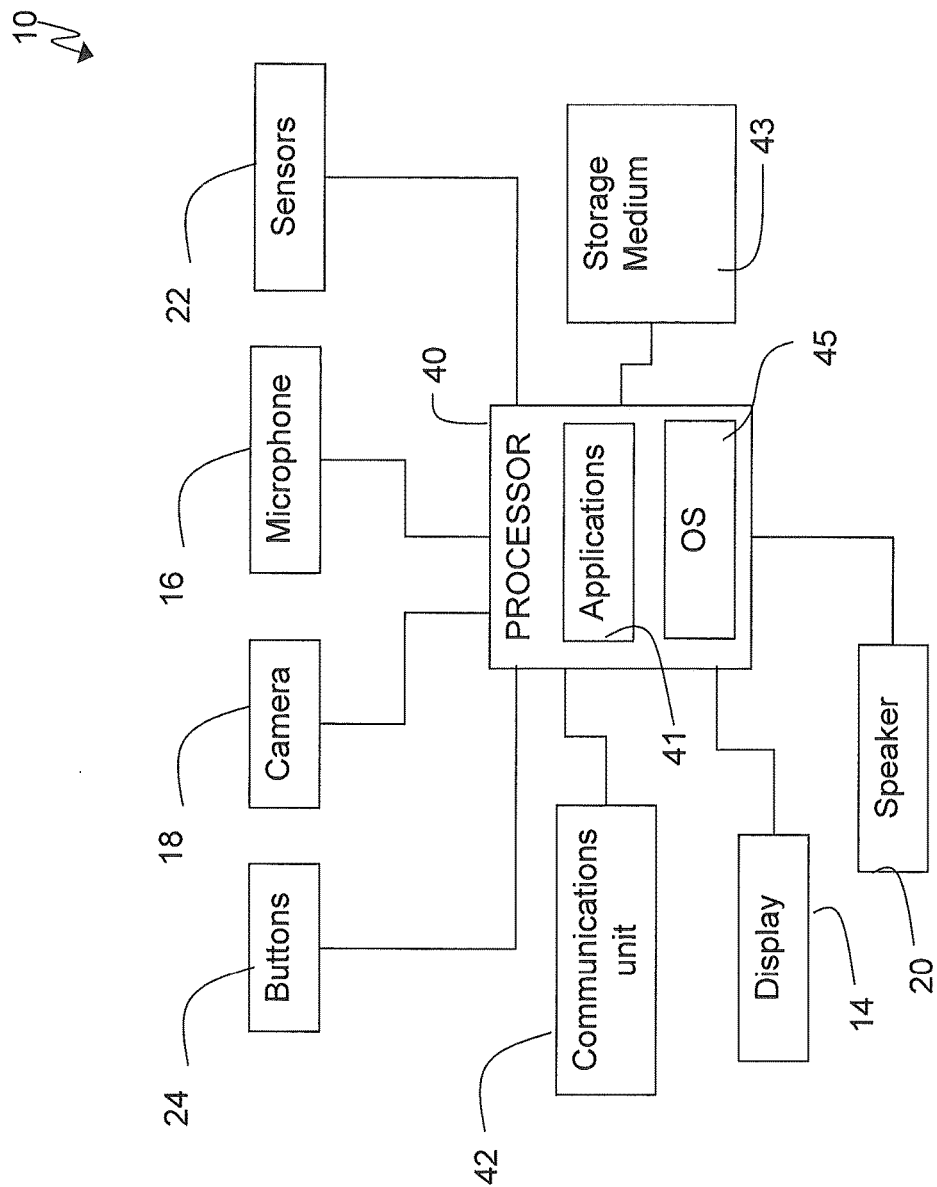
FIG. 1 depicts a mobile device in an exemplary embodiment.

FIG. 1 illustrates a mobile device 10 according to an exemplary embodiment. Mobile device 10 may be a phone, tablet, personal digital assistant, etc., equipped with communications components (e.g., cellular, wireless LAN, NFC, Bluetooth, USB) for communicating over wireless or wired communications mediums. Mobile device 10 includes a display 14 such as an organic light emitting diode (OLED) display or liquid crystal diode (LCD) display, a microphone 16 used for voice communications and for receiving spoken commands from a user, a camera 18, a speaker 20 that provides audio output to the user, and one or more buttons 24 for controlling the device. Buttons 24 may be permanent components built into a housing or may be virtual buttons, presented on display 14, activated by touching display 14. One or more sensors 22 may be used to sense various parameters such as location (e.g., GPS receiver), etc.

A processor 40 controls operation of mobile device 10. Processor 40 may be implemented using a general-purpose microprocessor executing a computer program stored in a computer readable storage medium 43 to execute the processes described herein. Processor 40 may include memory (e.g., RAM) for loading programs for execution. Storage medium 43 provides storage accessible by applications 41. Storage medium 43 provides for storage of capsules defining security levels associated with data and applications on the mobile device 10. Processor 40 executes an operating system 45 and a number of applications 41, such as an email application, a calendar application, etc.

Processor 40 is also coupled to a communications unit 42 that handles communications between the mobile device 10 and other devices, such as cellular phone calls, NFC communications, Bluetooth, etc. The communications unit 42 is configured to communicate over a wireless network and may also include a port (e.g., USB) for wired connections.

Figure 2:
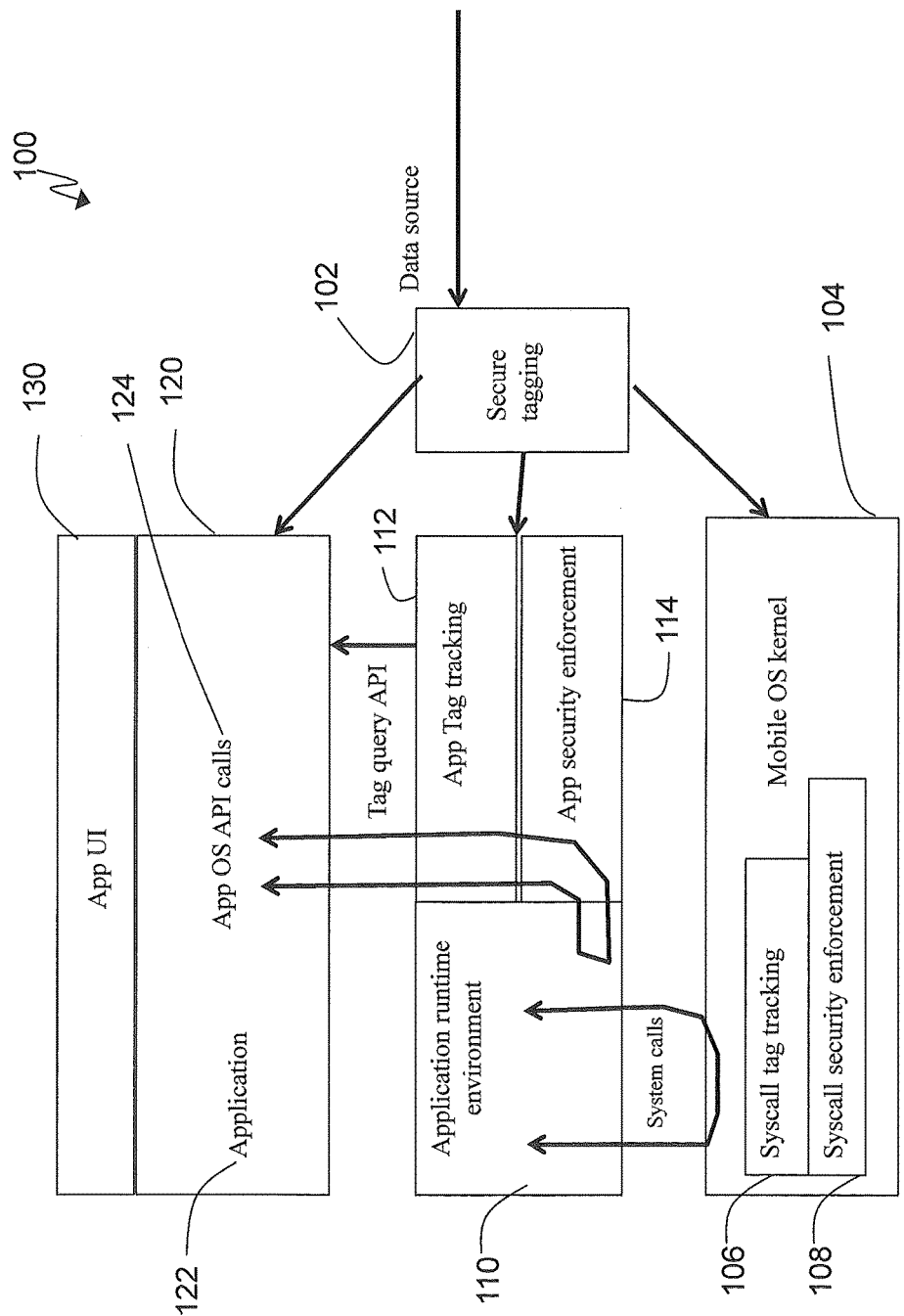
FIG. 2 depicts an architecture for security management in an exemplary embodiment.

FIG. 2 depicts architecture 100 for security management on mobile device 10 in an exemplary embodiment. As data is received from a data source, a secure tagging function 102 assigns a tag to the data. The data source may be external to the mobile device (e.g., retrieved from a server) or generated at the mobile device (e.g., a photo taken by the camera). Prior to any data being stored, the data is assigned a data tag that is used control access to the data and control propagation of the data, both internal and external to the mobile device 10. Tags assigned to data may be used to prevent data with different tags from being mixed. As data is accessed and processed, the tag associated with that data may change. Data tags are also propagated, i.e., if new data is produced by the processing of tagged data, it inherits the data tag of that processed data. This ensures that data that may be derived from tagged data also stays within the same security-perimeter. Applications may be assigned an application tag based on what operations are being performed, what data is accessed, and/or the environment where the mobile device is operating. Managed applications (e.g., those that run in an instrumented runtime environment) may also process data having multiple tags as long as the managed applications do not mix data having different tags or violate security policies associated with the tags.

Figure 3:
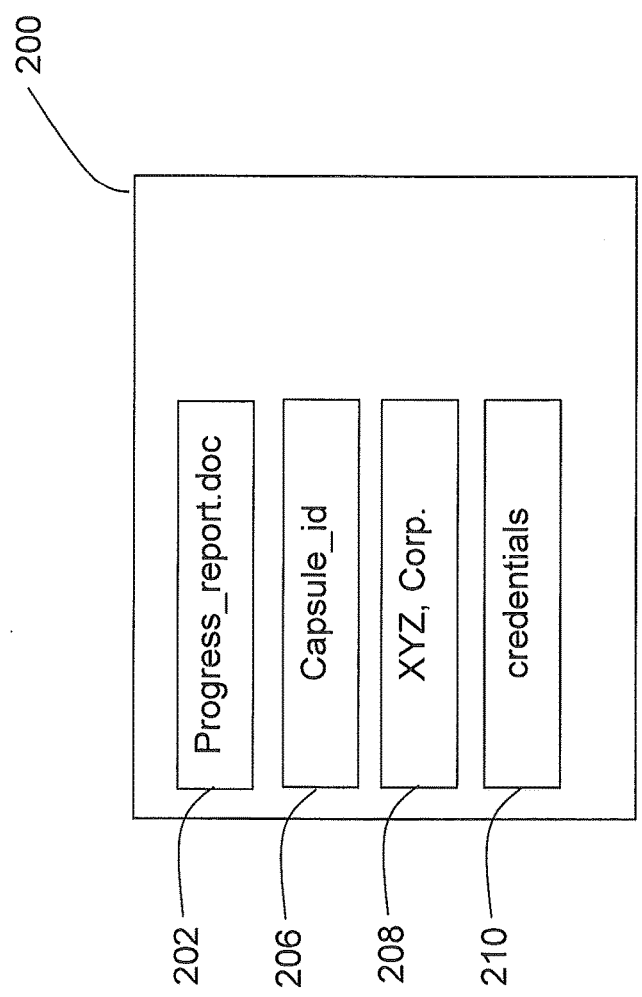
FIG. 3 depicts a capsule in an exemplary embodiment.

The secure tagging function 102 may assign a tag to the data based on a capsule that incorporates the data and a data tag. The capsule may be considered similar to an encrypted folder containing the data and other fields and defines a micro-security perimeter. FIG. 3 shows an exemplary capsule 200 having data 202 (e.g., a document from the workplace), a unique capsule identifier 206 and an owner 208. It is understood that other fields may be incorporated into the capsule 200. For example, if user credentials 210 are needed to access the data (e.g., a pin, user login and password), these fields may be incorporated in capsule 200 as well. When the tagged credentials are used to access an external resource (e.g., an email server), any data that comes back (e.g., an email), will be tagged with the same tag, so as to ensure that the retrieved data is in the same security perimeter as the credentials provided in the capsule. Capsule 200 may include a security/mixing policy that requires the user to enter a passcode when any data in the capsule is accessed by an application. Such a policy may also require the data in the capsule 200 to be decrypted only after the passcode is entered, is to prevent data access when a device is lost, stolen, etc.

Referring back to FIG. 2, secure tagging function 102 receives capsule 200 and associates a data tag with data 202, prior to storing capsule 200 on the mobile device (e.g., on storage medium 43). It is understood that instead of data 202, capsule 200 may include an application for installation on mobile device 10. In this case, an application tag is assigned to the application contained in the capsule 200. It is noted that the data tag and/or application tag may be neutral, for example, not initially associated with a particular environment (e.g., personal or workplace).

Architecture 100 includes an operating system level 104. Operating system level 104 implements a system call tag tracking application 106 that tracks data tags and application tags between processes executing on mobile device 10. Operating system level 104 also implements a system call security enforcement application 108 that allows or prevents operations based on the data tags and application tags. The system call tag tracking application 106 and system call security enforcement application 108 assign data tags and application tags during interaction between processes to prevent mixing of data tags and/or application tags of different types, and to propagate the appropriate data tags and/or application tags upon execution of processes. Operating system level 104 may be referred to as managing security between processes or inter-process.

Architecture 100 includes an application runtime level 110. Application runtime level 110 provides a runtime environment (e.g., Android Dalvik) for applications executing on the mobile device 10. Application runtime level 110 implements an application tag tracking application 112 that tracks data tags and application tags within a process executing on the mobile device 10. Application runtime level 110 also implements an application security enforcement application 112 that allows or prevents operations based on the data tags and application tags. The application tag tracking application 112 and application security enforcement application 114 assign data tags and application tags within a process to prevent mixing of data tags and/or application tags of different types, and propagate the appropriate data tags and/or application tags upon execution of a process. Application runtime level 110 may be referred to as managing security within a process or intra-process.

An application program interface level 120 provides a mechanism for an application 122 executing on mobile device 10 to generate an application program interface call 124 to the operating system level 104 to determine a data tag and/or an application tag for data and/or an application that the executing application 122 is accessing. The application 122 can then reflect the nature of the data tag and/or application tag in an application user interface 130. For example, a document reader application accesses a document, and generates an application program interface call 124 to the operating system level 104 to determine a data tag for the document. The document reader interface can be displayed in response to the data tag (e.g., yellow for workplace document, green for personal document). Similarly, an email application may present personal emails in a first color and workplace emails in a second color.

Figure 4:
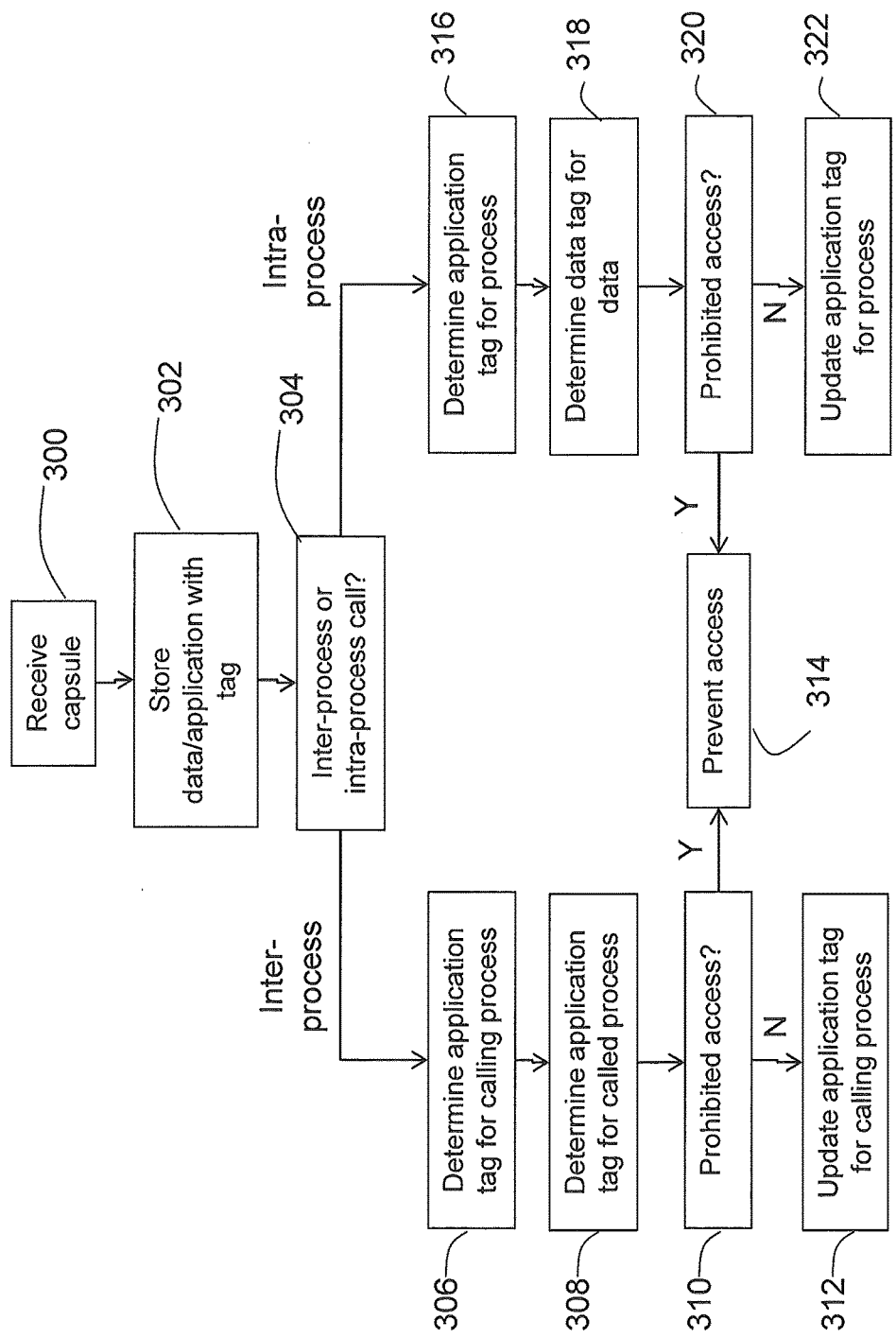
FIG. 4 is a flowchart of a process for security management in an exemplary embodiment.

FIG. 4 is flowchart of processing performed by mobile device 10 to manage security in an exemplary embodiment. The process begins at 300 where capsules 200 are received at the secure tagging function 102. As described above with reference to FIG. 2, capsules 200 are stored on mobile device 10 along with the appropriate data tag and/or application tag at 302. At 304, an application executing on mobile device 10 initiates a call. If the call is an inter-process call, flow proceeds to 306. At 306, system call tag tracking application 106 determines the application tag associated with the calling process. At 308, system call tag tracking application 106 determines the application tag associated with the called process. At 310, the system call security enforcement application 108 determines if the calling process is prohibited from accessing the called process based on the application tags associated with the calling process and the called process (and the security policy, e.g., what kind of mixing is allowed, if at all). The application tags of the calling process and the called process are considered to match if the application tags of the calling process and the called process do not conflict. For example, the application tags of the calling process and the called process may be identical, thereby permitting access. Alternatively, one of the application tags of the calling process and the called process may be neutral, thereby allowing access. Both such cases are considered a match.

If at 310, the application tags of the calling process and the called process match, flow proceeds to 312 where the access is permitted. The application tag for the current instance of the calling process may be updated to reflect access to the called process (also, the tag of the called process may be updated if data flows from the caller to the callee). If at 310, the application tags of the calling process and the called process do not match, flow proceeds to 314 where the access is prohibited. At 314, the user may be notified of the prohibited access through user interface 130.

If at 304, the call is an intra-process call, flow proceeds to 316. For intra-process tag propagation, the application runtime environment 110 tracks each instruction and tags all the individual data or memory objects. At 316, application tag tracking application 112 determines the application tag associated with the process. At 318, application tag tracking application 112 determines the data tag associated with the data. At 320, the application security enforcement application 114 determines if the process is prohibited from accessing the data based on the application tag associated with the process and the data tag. The application tag of the process and the data tag are considered to match if the application tag of the process and the data tag do not conflict. For example, the application tag of the process and the data tag may be identical, thereby permitting access. Alternatively, one of the application tag and the data tag may be neutral, thereby allowing access. Both such cases are considered a match. In other embodiments, the resultant of the processing of the data is observed by application security enforcement application 114. If the data tag of the output of the process does not match the data tag of the data, then execution of the process can be terminated to prevent the resultant of the process from being output. For example, an application cannot access personal data and output a resultant workplace data. This prevents co-mingling of different types of data.

If at 320, the application tag of the process and the data tag match, flow proceeds to 322 where the access is permitted. The application tag for the current instance of the process may be updated to reflect access to the data. For example, if an email process access a workplace address or workplace document, then that email instance is assigned the workplace data tag. Further, any data output by the process may be assigned the data tag, so that the data tag propagates through the system. If at 320, the application tag of the process and the data tag do not match, flow proceeds to 314 where the access is prohibited. At 314, the user may be notified of the prohibited access through user interface 130.

Examples of operation of the system are provided to illustrate exemplary embodiments. In one example, a user accesses an email process running on mobile device 10. Initially, the email process may have no application tag. As the user composes an email, the email process makes a system call through operating system level 104 to an address book process to obtain an email address. The email address, for example, is associated with a data tag (e.g., personal) and thus, the system call tag tracking application 106 assigns an similar application tag to the email (e.g., personal). For sake of illustration, assume the user now attempts to attach a business document to the email. The business document is associated with a data tag of a different type (e.g., workplace). The system call security enforcement application 108 prevents the business document from being attached to the email, as the data tag does not match the application tag. The user would be notified of the prohibition.

In another example, a user obtains a picture using camera 18. Prior to storage, the picture is received at secure tagging function 102, in a capsule generated by the camera process. Capsule 200 may be associated with different data tags for the picture depending on the location and/or time when the picture was taken, as determined by sensors 22. If mobile device 10 is within a certain area (e.g., the workplace) or taken during a certain time (e.g., work hours), the capsule containing the picture is associated with a workplace security level. If mobile device 10 is outside the certain area or time (e.g., on vacation) the capsule containing the picture is associated with a personal security level.

In another example, a user downloads a video to mobile device 10. The video is contained in capsule that provides digital rights management for the video. The capsule is assigned a data tag that prevents the video from leaving mobile device 10, so that attempting to email, upload, or otherwise transmit the video would be prohibited. This allows the user of mobile device 10 to view the video using any viewer installed on mobile device 10, rather than a viewer required by the supplier of the video to manage digital rights.

Embodiments described herein provide fine-grained policy based data-protection as a first class primitive in a mobile device operating system so that the user doesn't have to maintain completely different environments for different categories of data stored on the mobile device. This allows individual data and applications to be contained in micro-security perimeters, referred to as capsules. These capsules can be securely installed on a phone, and are subject to a data security policy defined by the capsule owner. The policy may specify what kinds of data mixing is allowed, and can be a function of the current security context. The operating system tracks the flow of data on a per-capsule basis as it is used by applications on the phone, and enforces the security policies associated with the capsules.

As described above, the exemplary embodiments can be in the form of processor-implemented processes and devices for practicing those processes, such as processor 40. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for managing security levels on a mobile device, the method comprising:
   assigning, at the mobile device, a first data tag to a capsule including first data and information associated with the first data, the first data tag identifying a security level for the first data, the security level corresponding to at least one of a personal security level and a workplace security level;
   storing the capsule on the mobile device;
   detecting a system call performed by an email process to an address book process, the email process executing on the mobile device;
   in response to the system call, assigning, by executing an instruction with a processor of the mobile device, an application tag to the email process based on a recipient email address obtained from the address book process for an email being composed with the email process, the application tag corresponding to at least one of the personal security level and the workplace security level;
   allowing, by executing an instruction with the processor, the email process to include the first data with the email when the application tag matches the first data tag; and
   preventing the first data from being included with the email when the application tag does not match the first data tag.

2. The method of claim 1, wherein the application tag is a first application tag, the system call is a first system call, and further including:
   detecting a second system call made by the email process to access a second called process, the second called process having a second application tag; and
   allowing, by an operating system kernel, access to the second called process when the second application tag matches the first application tag.

3. The method of claim 2, further including changing the first application tag to correspond to the second application tag.

4. The method of claim 1, further including:
   generating, by a user interface application, a request to identify a second data tag associated with second data, the request submitted to an application program interface;
   generating, by an operating system kernel, a reply to the request to identify the second data tag; and
   displaying, by the user interface application, an indicia of the second data in response to the reply to the request to identify the second data tag received from the application program interface.

5. The method of claim 4, further including assigning the second data tag based on a location of the mobile device and a time at which the second data is obtained.

6. The method of claim 5, wherein the assigning of the second data tag includes:
   assigning the second data tag the workplace security level when the location of the mobile device corresponds to a first location and the time corresponds to a first time; and
   assigning the second data tag the personal security level when the location of the mobile device corresponds to a second location different from the first location and the time corresponds to a second time different from the first time.

7. An apparatus comprising:
   a processor; and
   memory including computer-executable instructions that, when executed by the processor, cause the processor to perform operations, the operations including:
      assigning a first data tag to a capsule including first data and information associated with the first data, the first data tag identifying a security level for the first data, the security level corresponding to at least one of a personal security level and a workplace security level;
      storing the capsule;
      detecting a system call performed by an email process to an address book process;
      in response to the system call, assigning an application tag to the email process based on a recipient email address obtained from the address book process for an email being composed with the email process, the application tag corresponding to at least one of the personal security level and the workplace security level;
      allowing the email process to include the first data with the email when the application tag matches the first data tag; and
      preventing the first data from being included with the email when the application tag does not match the first data tag.

8. The apparatus of claim 7, wherein the application tag is a first application tag, the system call is a first system call, and the operations further include:
   detecting a second system call made by the email process to access a second called process, the second called process having a second application tag; and
   allowing, by an operating system kernel, access to the second called process when the second application tag matches the first application tag.

9. The apparatus of claim 8, wherein the operations further include:
   changing the first application tag to correspond to the second application tag.

10. The apparatus of claim 7, wherein the operations further include:
    generating, by a user interface application, a request to identify a second data tag associated with second data, the request submitted to an application program interface;
    generating, by an operating system kernel, a reply to the request to identify the second data tag; and
    displaying, by the user interface application, an indicia of the third data in response to the reply to the request to identify the third data tag received from the application program interface.

11. The apparatus of claim 10, wherein the operations include further assigning the second data tag based on a location of the apparatus and a time at which the second data is obtained.

12. The apparatus of claim 11, wherein the assigning of the second data tag includes:
    assigning the second data tag the workplace security level when the location of the apparatus corresponds to a first location and the time corresponds to a first time; and
    assigning the second data tag the personal security level when the location of the apparatus corresponds to a second location different from the first location and the time corresponds to a second time different from the first time.

13. A computer readable memory including instructions that, when executed by a processor of a mobile device, cause the processor to perform operations comprising:
   assigning a first data tag to a capsule including first data and information associated with the first data, the first data tag identifying a security level for the first data, the security level corresponding to at least one of a personal security level and a workplace security level;
   storing the capsule on the mobile device;
   detecting a system call performed by an email process to an address book process;
   in response to the system call, assigning an application tag assigned to the email process based on a recipient email address obtained from the address book process for an email being composed with the email process, the application tag corresponding to at least one of the personal security level and the workplace security level;
   allowing the email process to include the first data with the email when the application tag matches the first data tag; and
   preventing the first data from being included with the email when the application tag does not match the first data tag.

14. The computer readable memory of claim 13, wherein the application tag is a first application tag, and the operations further include:
   detecting a system call made by the email process to access a second called process, the second called process having a second application tag; and
   allowing, by an operating system kernel, access to the second called process when the second application tag matches the application tag.

15. The computer readable memory of claim 14, wherein the operations further include:
   changing the first application tag to correspond to the second application tag.

16. The computer readable memory of claim 13, wherein the operations further include:
   instructing a user interface application to generate a request to identify a second data tag associated with second data, the request submitted to an application program interface;
   generating, by an operating system kernel, a reply to the request to identify the second data tag; and
   instructing by the user interface application to display an indicia of the second data in response to the reply to the request to identify the second data tag received from the application program interface.

17. The computer readable memory of claim 16, wherein the operations further include assigning the second data tag based on a location of the mobile device and a time at which the second data is obtained.

18. The computer readable memory of claim 17, wherein the assigning of the second data tag includes:
   assigning the second data tag the workplace security level when the location of the mobile device corresponds to a first location and the time corresponds to a first time; and
   assigning the second data tag the personal security level when the location of the mobile device corresponds to a second location different from the first location and the time corresponds to a second time different from the first time.

* * * * *